Figure 1:
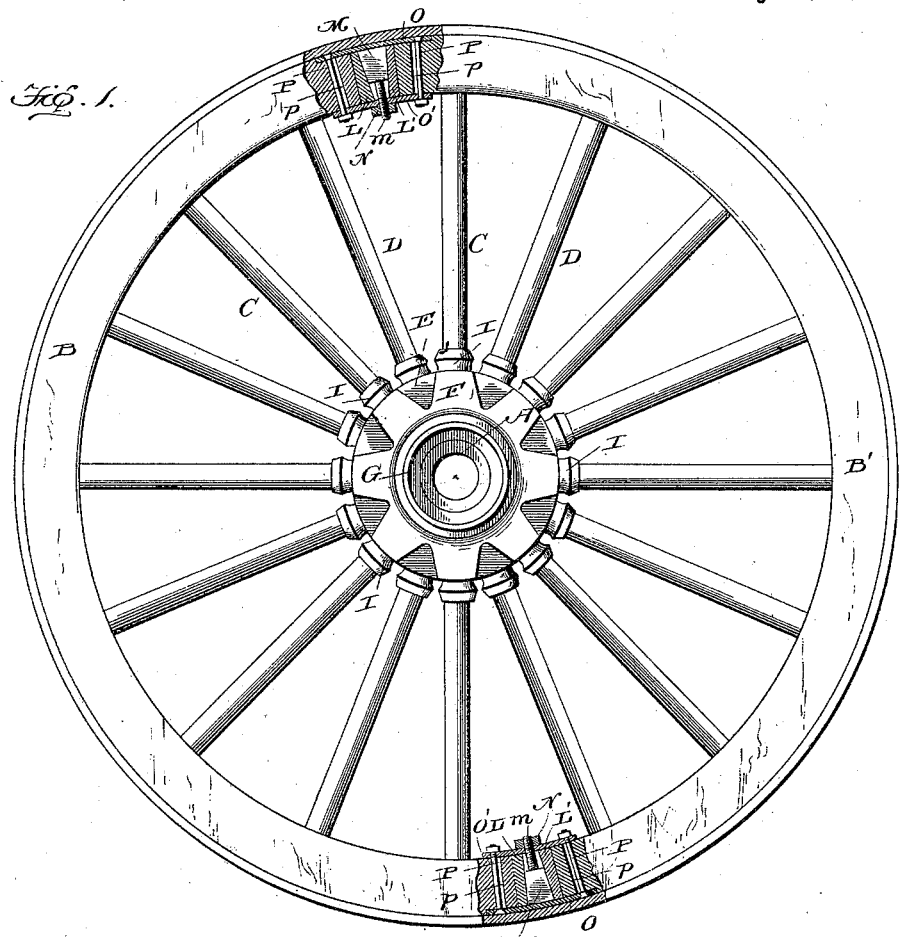

(No Model.) 2 Sheets—Sheet 1.

G. C. HALE.
WHEEL.

No. 542,588. Patented July 9, 1895.

Witnesses
Wm. C. Dashiell
H. F. Bernhard

Geo. C. Hale
Inventor

By Edson Bros.
Attorneys (No Model.) 2 Sheets—Sheet 2.
G. C. HALE.
WHEEL.
No. 542,588. Patented July 9, 1895.
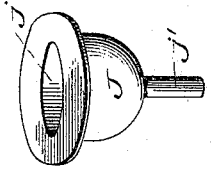
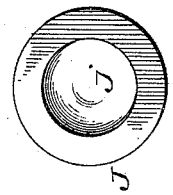
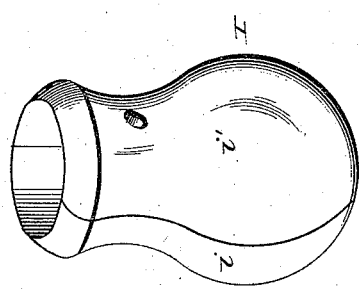
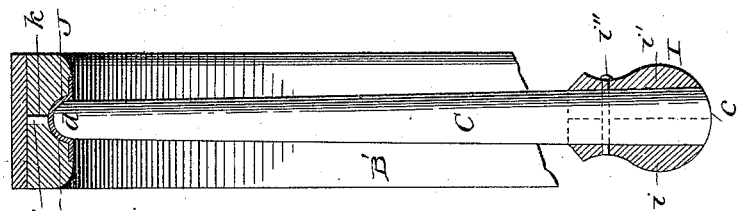
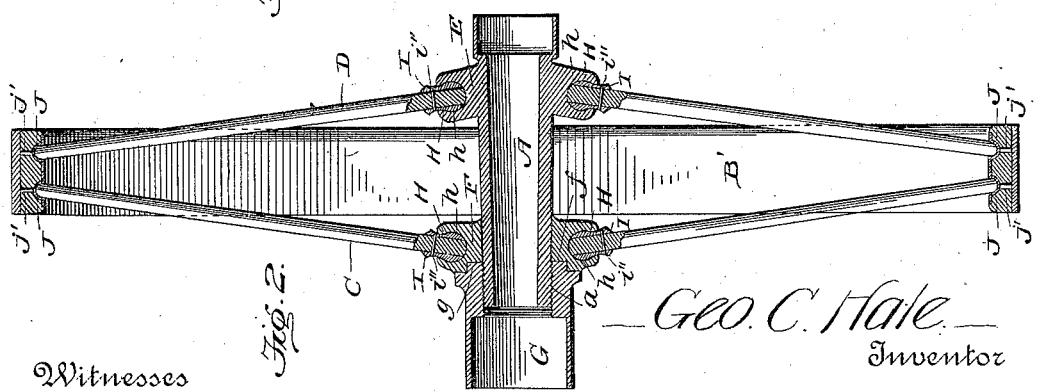
Witnesses
Geo. C. Hale
Inventor
By Edson Bros
Attorneys

UNITED STATES PATENT OFFICE.

GEORGE C. HALE, OF KANSAS CITY, MISSOURI, ASSIGNOR OF ONE-HALF TO JOSEPH J. HEIM, OF SAME PLACE.

WHEEL.

SPECIFICATION forming part of Letters Patent No. 542,588, dated July 9, 1895.

Application filed November 13, 1894. Serial No. 528,653. (No model.)

*To all whom it may concern:*

Be it known that I, GEORGE C. HALE, a citizen of the United States, residing at Kansas City, in the county of Jackson and State of Missouri, have invented certain new and useful Improvements in Wheels; and I do hereby declare the following to be a full, clear, and exact description of the invention, such as will enable others skilled in the art to which it appertains to make and use the same.

The present invention relates to improvements in wheels for vehicles of all descriptions; and the object that I have in view in the present instance is to provide an improved wheel of simple and durable construction which can be conveniently and easily adjusted by the simple application and manipulation of a wrench to take up the slack or looseness between the felly, hub, and spokes due to shrinkage of the wood, and thus keep the wheel in a taut, rigid condition.

It is the common practice of carriage and wagon builders to supply vehicles with wheels which are joined together in a rigid manner; but as ordinarily constructed the wheels are not provided with compensating or adjusting appliances for taking up the slack that takes place, which is due primarily to the shrinkage of the wood of which the wheel is built, and as a natural consequence of wear, use, and frequently from the neglect of the owner the spokes and felly become loose, so that the wheel must be taken to a repair-shop to have its parts tightened up. I am to overcome these objections by providing the wheel with compensating appliances, whereby the spokes may be adjusted radially between the hub and felly, and the latter may be adjusted circumferentially to take up any slack or looseness that occurs by the shrinkage of the spokes and by the felly. To the accomplishment of these ends, the first part of my invention consists in the combination of a metallic hub provided at one end with a fast or integral sleeve or collar formed with sockets to receive the inner ends of one series of spokes, a slidable adjustable collar or sleeve fitted on the outer end of the metallic hub and likewise provided with sockets to receive the inner ends of another series of spokes, and an adjusting-nut screwed in the threaded end of said hub and bearing against the slidable collar, said adjusting-nut being constructed to receive a wrench or spanner to enable the same to be rotated and to force the collar along the hub toward the fixed collar and push the spokes radially to take up the slack thereof. In this embodiment of my invention I construct the fast and slidable hub collars or sleeves with sockets, which are enlarged at their inner parts that lie nearest to the hub, and in order to fasten the spokes in said sockets I provide each spoke with gibs, which are made in sections, to embrace the inner enlarged end of the spoke, and which gib-sections are enlarged at one end to enable them to properly fit in the enlarged part of the spoke-socket, whereby the inner end of the spoke is keyed in the socket, and said spoke has a large end bearing upon the socket and hub. It will be understood that this form of key or gib and socket connection is provided for the inner larger end of the spoke upon the hub, and this form of spoke connection is especially desirable and advantageous for the slidable sleeve or collar, because the spokes are permitted to turn in the sockets of said slidable sleeve when it is adjusted, and the spokes are thus enabled to accommodate themselves to the travel of the slidable collar.

The second part of my invention resides in the means for adjusting the felly circumferentially to take up the slack therein, and in this embodiment of the invention a pair of wedge-shaped plates are interposed between the contiguous ends of two felly-sections with their reversely-inclined faces opposite to each other, and with said plates is combined an adjusting-wedge, which is interposed between the opposing inclined faces of the plates, and which is provided with a threaded stem that protrudes within the wheel-felly toward the hub. On this threaded stem is fitted an adjusting-nut, which can be turned to draw the adjusting-wedge toward the wheel-hub and force the plates laterally and the felly circumferentially, and said plates and the wedge are confined within the felly by retaining-plates that are applied to the inner and outer edges of the felly, the retainer-plates being held to the felly by bolts which pass through the plates and slots in the felly; and the invention further consists in the means for connecting the outer ends of the spokes to the felly; and it finally consists in the novel combination of devices and in the peculiar construction and arrangement of parts, which will be hereinafter fully described and claimed.

To enable others to more readily understand my invention, I have illustrated the preferred embodiment thereof in the accompanying drawings, forming a part of this specification, and in which—

Figure 7:
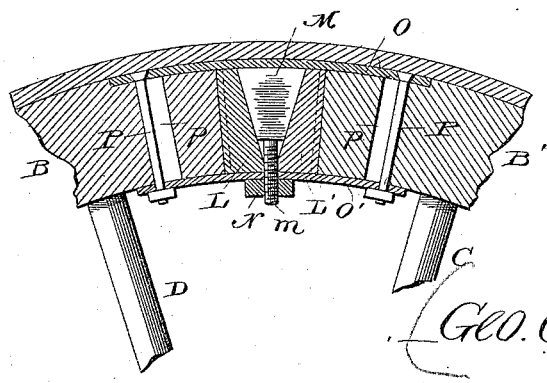

Figure 1 is a side elevation of a vehicle-wheel embodying my improvements. Fig. 2 is a vertical transverse sectional view thereof, taken centrally through the hub and the felly, showing the spokes in elevation. Fig. 3 is an enlarged detail view of one of the spokes, showing the latter in side elevation with its gibs in section and with the felly and the socket between the outer end of the spoke and the felly in transverse section. Fig. 4 is a detail perspective view of one of the gibs. Figs. 5 and 6 are detail views, in perspective and top plan, respectively, of the socket for the outer end of the spoke. Fig. 7 is an enlarged view showing the felly in section and with the felly-adjusting devices in elevation.

Like letters of reference denote corresponding parts in all the figures of the drawings, referring to which—

A designates the hub, B B' the felly, and C D the two series of spokes, of an improved vehicle-wheel constructed in accordance with the present invention. As is usual in this class of devices, the spokes forming the two series are arranged in "staggered" relation to one another, or, in other words, the spokes forming the series C alternate with the spokes forming the other series D, and the spokes of both series are inclined from the ends of the hub toward each other, so as to lie close together at the points where they are joined or socketed to the felly B B', as will be readily understood by reference to Fig. 2 of the drawings.

In my present invention I dispense with a wooden hub having a plurality of sockets formed in its periphery to receive the inner ends of the spokes forming the two series, and in lieu of this common construction I employ a cast or metallic hub A and two sleeves or collars E F. These sleeves or collars are arranged at opposite ends of the hub, the one E being made fast to the right-hand end of the hub, so as to be immovable thereon, while the other collar F is made so as to closely fit the left-hand end of the hub and yet be adjustable or movable thereon a limited distance under the influence of the adjustable nut G.

In the preferred embodiment of my invention I cast the hub A with the fast sleeve E as an integral part thereof, although it will be understood that the sleeve or collar E may be separate from the hub and rigidly united thereto in any suitable manner—as, for instance, by welding the sleeve on the hub or by bolting the same thereto. The other or slidable sleeve F is cast separate from the hub, and it is formed or otherwise manipulated to fit snugly to the opposite end of the hub from the collar E. This slidable sleeve F is fitted on a smooth portion of the hub, within one end thereof, and the projecting end of the hub A is externally screw-threaded at $a$ to accommodate the interiorly-threaded nut G, the latter being arranged to project beyond the end of the hub and constructed to receive a wrench or spanner, whereby the adjusting-nut may be rotated to force the adjustable sleeve F along the hub A.

In Fig. 2 of the drawings I have shown the slidable sleeve as provided with a recess $f$ in one of its faces to receive the boss $g$, that projects laterally from the inner end of the adjusting-nut G, so that the sleeve F and nut G are formed to fit closely together and prevent any dirt, dust, &c., from accumulating between the opposing faces of the adjustable sleeve and the nut provided for its convenient adjustment.

The fast and slidable sleeves or collars E F of my improved wheel are provided with integral sockets H to receive the inner ends of the spokes C D, and also provided with the gibs I, whereby the spokes are keyed and held in the sockets. The sleeves E F at opposite ends of the hub A are set in such relation to each other that the spoke-sockets H in the sleeves have the desired staggered or alternate relation to each other to properly accommodate the spokes C D, and each socket H is enlarged and rounded, as at $h$, at its inner portion, which lies closest to the hub A. (See Fig. 2.)

The spokes C D are each made tapering throughout its length, (see Fig. 3,) and the inner enlarged end thereof is adapted to be seated in the enlarged rounded end of the socket H and to receive the gib I, by which said enlarged end of the spoke is held or confined in its socket on the hub, said spoke having its inner enlarged heel rounded, as indicated at $c$ in Fig. 3.

Each gib I is made in two sections $i$ $i'$, which are shaped to embrace the opposite sides of the spoke, and which gib-sections are rigidly fastened to the spoke by the through bolt or rivet $i''$, which passes through the sections $i$ $i'$ of the gib and through the spoke. The inner ends of these gib-sections are enlarged and rounded to conform to the contour of the part $h$ of the spoke-socket, and when the inner end of the spoke, with its gib I thereon, is fitted in the socket H this gib I serves to key and hold the spoke in the socket on the hub, whereby the spoke is prevented from becoming disconnected from the hub and at the same time the inner end of the spokes D, which are seated in the sockets of the slidable collar F, are permitted to have a limited turning movement in the sockets to enable the spokes to accomodate themselves to the travel and adjustment of the slidable collar or sleeve F, as will be readily understood.

The outer reduced ends of the tapered spokes are fitted in the thimbles J, which are in turn seated in the wheel-felly to hold the spokes in position on the felly. This thimble J is made in a single piece of metal with a socket $j$ and with a tenon $j'$, and in the preferred embodiment of my invention I make this thimble, by pressing or stamping it from a single piece of metal, of sufficient strength to stand the strain and pressure to which it is subjected when the spokes are adjusted radially with respect to the hub A. The outer end of the spoke is rounded at $d$, and the socket is made hemispherical in form to receive the rounded end of the spoke and permit the latter to turn in the socket attached to the felly, whereby the spoke can adjust itself in the felly to enable it to assume a straight inclined position when the slidable sleeve is moved on the hub to take up the slack in the spoke. The felly is provided with a cavity $k$ on its inside and with a radial passage or opening $k'$, and the thimble is applied to the felly by thrusting the tenon into passage $k'$ and the socket $j$ into the cavity $k$, the thimble being applied so that the open end of the socket $j$ faces inward toward the hub A, in order that the spoke may be readily seated in the thimble. In practice two cavities are formed on the inner face or edge of the felly to receive the spokes of the two series C D, as indicated in Fig. 2.

I will now proceed to describe the improved means for adjusting the felly circumferentially.

My improved adjusting devices are applied to the wheel at diametrically-opposite sides, as shown by Fig. 1, and each felly-adjusting appliance contemplates the employment of a pair of wedge-shaped plates L L', an adjusting-wedge M, a threaded stem $m$, an adjusting-nut N, the retainer-plates O O', and the bolts P P, for holding the retainer-plates on the inner and outer edges of the felly-sections B B'. The contiguous ends of the felly-sections B B' are cut away to provide a space to accommodate the felly-adjusting appliance, and at their spaced ends the sections B B' are provided with transverse slots $p\,p$, which extend a short distance in the direction of the length of the felly-sections. The retainer-plates O O' are curved to enable them to fit snugly against the inside and outside edges of the wheel-felly, and through these plates O O' and the slots $p\,p$ in the felly-sections are passed the bolts P P, which serve to hold the felly-plates O O' in place and also enable the sections B B' to have a limited movement within the plates, whereby the felly-sections can be expanded circumferentially by the action of the wedge and its co-operating plates to compensate for any slack in the felly of the wheel. The wedge-shaped plates L L' are provided with straight outer faces that abut squarely against the ends of the felly-sections, and the inclined faces of these plates L L' are opposed to each other, so as to coact with the faces of the adjusting-wedge M, which is interposed between the plates L L', as shown very clearly by Fig. 7 of the drawings. This adjusting-wedge M is provided with a threaded tenon $m$, which is rigid or fast with the wedge and which projects between the plates L L' and through an opening in the inner retainer-plate O'. This threaded tenon receives an adjusting-nut N, arranged to bear against the retainer-plate O', and by turning this nut in one direction the wedge will be drawn toward the center of wheel and thereby force the plates L L' apart to effect the circumferential adjustment of the wheel-felly.

The operation and advantages of my invention will be readily understood and appreciated by those skilled in the art from the foregoing description, taken in connection with the drawings.

It is evident that slight changes in the form and proportion of parts and in the details of construction of the devices herein shown and described as the preferred embodiment of my invention can be made by a skilled mechanic without departing from the spirit or sacrificing the advantages of the invention, and I therefore reserve the right to make such modifications and alterations as fairly fall within the scope of the invention.

Having thus fully described my invention, what I claim as new, and desire to secure by Letters Patent, is—

1. In a wheel, the combination with a hub, of the fast and slidable collars provided with sockets, a series of spokes fitted in the sockets of the fast collar, and another series of spokes provided with ball shaped ends which are seated and keyed in the sockets of the slidable collar to turn therein, for the purposes described, substantially as set forth.

2. In a wheel, the combination with a hub and a felly, of the fast and slidable collars fitted to the hub and each collar provided with rounded sockets, and the spokes each having its outer end seated in the felly to turn therein and keyed in a rounded socket on one of the collars by a ball shaped gib which permits the inner end of the spoke to have a turning movement on the hub, substantially as and for the purposes described.

3. The combination with a hub, and a slidable collar provided with sockets, of a series of spokes, and enlarged, rounded gibs or keys which are seated in said sockets and hold the spokes therein against endwise movement but permitting a limited turning movement of said spokes, substantially as and for the purposes described.

4. In a wheel, the combination of a hub provided with ball shaped sockets, the spokes fitted in said sockets, and a ball shaped gib or key applied to each spoke and fitted within the socket, substantially as and for the purposes described.

5. In a wheel, the combination of a socket on the hub, a spoke, and a rounded sectional gib fastened to the spoke and fitted in an enlargement of the socket, substantially as and for the purposes described.

6. In a wheel, the combination of a rounded socket on the hub, a tapered spoke having a rounded inner end which bears upon the walls of the socket, and a rounded gib fastened to the inner end of said spoke and provided with an enlarged portion which fits snugly in the socket, substantially as and for the purposes described.

7. In a wheel, the combination of a spoke, a sectional gib having its members applied to the spoke and provided with the enlarged rounded ends, means for fastening the sectional gib to the spoke, and a socket which has an enlarged end to receive the enlarged portion of the gib, substantially as and for the purposes described.

8. In a wheel, the combination with a hub, of a fast collar thereon provided with ball shaped sockets, a slidable collar seated on the hub and likewise provided with the ball shaped sockets, and two series of spokes each of which is provided with a gib that fits in one of the sockets on said collars, whereby the spokes are keyed in the collars and said spokes can turn therein, to accommodate themselves to the travel of the slidable collar, substantially as and for the purposes described.

9. In a wheel, the combination of a felly having a cavity and an opening, a thimble struck up from a piece of metal to produce the tenon and the open socket which are fitted in the opening and cavity, respectively, of said felly, and a spoke having its outer rounded end seated in the socket of the thimble, substantially as and for the purposes described.

10. A wheel consisting of a hub, a divided felly having the inclined plates and the adjusting wedge, a series of rounded thimbles fitted in said felly, fast and slidable collars on said hub and provided with rounded sockets, and the spokes having their rounded outer ends seated in said thimbles and provided at their inner ends with rounded gibs which are fitted in the rounded sockets of said collars, substantially as and for the purposes described.

In testimony whereof I affix my signature in presence of two witnesses.

GEORGE C. HALE.

Witnesses.
A. J. KING,
EDMUND S. MINOR.